United States Patent
Devi et al.

(10) Patent No.: US 10,941,980 B2
(45) Date of Patent: Mar. 9, 2021

(54) PREDICTIVE MAINTENANCE OF REFRIGERATION CASES

(71) Applicant: INTERNATIONAL BUSINESS MACHINES CORPORATION, Armonk, NY (US)

(72) Inventors: Umamaheswari Devi, Bangalore (IN); Nicholas Ettlinger, Lexington, MA (US); Jacob T. Griffith, Dallas, TX (US); Benjamin Grisz, Dallas, TX (US); Jagabondhu Hazra, Bangalore (IN); Kedar Kulkarni, Bangalore (IN); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 15/696,306

(22) Filed: Sep. 6, 2017

(65) Prior Publication Data

US 2019/0072320 A1    Mar. 7, 2019

(51) Int. Cl.
*G06N 7/00* (2006.01)
*F25D 29/00* (2006.01)
(Continued)

(52) U.S. Cl.
CPC ............. *F25D 29/00* (2013.01); *F25D 21/02* (2013.01); *F25D 29/008* (2013.01); *G06N 5/04* (2013.01);
(Continued)

(58) Field of Classification Search
CPC ........ F25D 29/00; F25D 21/02; F25D 29/008; G06N 5/04; G06N 7/00
See application file for complete search history.

(56) References Cited

U.S. PATENT DOCUMENTS 6,505,475 B1    1/2003   Zugibe et al.
7,082,380 B2    7/2006   Wiebe et al.
(Continued)

FOREIGN PATENT DOCUMENTS

WO    2017004416 A1    1/2017

OTHER PUBLICATIONS

Alireza Behfar, David Yuill, and Yuebin Yu, "Automated fault detection and diagnosis methods for supermarket equipment (RP-1615)", Jul. 6, 2017, Science and Technology for the Built Environment, 23:8, pp. 1253-1266. (Year: 2017).*

(Continued)

*Primary Examiner* — Kamran Afshar
*Assistant Examiner* — Ying Yu Chen
(74) *Attorney, Agent, or Firm* — Kristofer L. Haggerty

(57) ABSTRACT

Embodiments of the present invention disclose a method, a computer program product, and a computer system for predictive maintenance of refrigeration cases. A computer collects a temperature time series for a refrigeration case and, based on the temperature time series, learns a refrigeration case signature for both non-frost and defrost cycles. The computer generates features based on the refrigeration case signature and compares the refrigeration case signature to real time, or observed, temperatures and features using a rule-based and/or machine learning framework. Based on determining that the real time data varies beyond a threshold from the refrigeration case signature, the computer identifies a failure symptom of the refrigeration case and diagnoses a root cause of the symptom or failure. In addition, the computer may activate an alarm and open a work order corresponding to the root cause of the symptom or failure.

11 Claims, 10 Drawing Sheets

(51) Int. Cl.
*G06N 5/04* (2006.01)
*F25D 21/02* (2006.01)
*F25D 21/00* (2006.01)

(52) U.S. Cl.
CPC ............. *G06N 7/00* (2013.01); *F25D 21/006* (2013.01); *F25D 2500/04* (2013.01); *F25D 2700/12* (2013.01)

(56) References Cited

U.S. PATENT DOCUMENTS

| | | |
|---|---|---|
| 9,489,341 B1 | 11/2016 | Ly et al. |
| 2004/0261431 A1 | 12/2004 | Singh et al. |
| 2007/0256432 A1 | 11/2007 | Zugibe et al. |
| 2009/0210102 A1* | 8/2009 | Thybo ............... F25D 29/00 700/299 |
| 2011/0224947 A1 | 9/2011 | Kriss |
| 2012/0166151 A1 | 6/2012 | Fisera et al. |
| 2014/0074730 A1 | 3/2014 | Arensmeier et al. |
| 2014/0142727 A1* | 5/2014 | Giering ............... G06N 5/046 700/79 |
| 2014/0148969 A1 | 5/2014 | Graziano et al. |
| 2014/0250925 A1 | 9/2014 | Prabowo et al. |
| 2014/0262134 A1 | 9/2014 | Arensmeier et al. |
| 2017/0268811 A1 | 9/2017 | Ochiai et al. |
| 2017/0300847 A1* | 10/2017 | Jones ............... F25D 13/00 |
| 2018/0012132 A1* | 1/2018 | Meadow ............... G06N 7/005 |
| 2018/0142929 A1* | 5/2018 | Prabhakaran ......... F25B 49/005 |

OTHER PUBLICATIONS

Fisera et al., "Performance Monitoring of the Refrigeration System with Minimum Set of Sensors," International Journal of Electrical, Computer, Energetic, Electronic and Communication Engineering, vol. 6, No. 7, 2012 (Best Date Available), pp. 1-7.

Yang et al., "Fault Detection and Isolation for a Supermarket Refrigeration System—Part One: Kalman-Filter-Based Methods," Proceedings of the 18th World Congress, The International Federation of Automatic Control, Milano (Italy), Aug. 28-Sep. 2, 2011, pp. 13233-13238.

Srinivasan et al., "Bugs in the Freezer: Detecting Faults in Supermarket Refrigeration Systems Using Energy Signals," e-Energy '15, Jul. 14-17, 2015, Bangalore, India, Copyright 2015 ACM, 978-1-4503-3609—Mar. 15, 2007, pp. 101-110.

Thybo et al., "Development of Fault Detection and Diagnosis Schemes for Industrial Refrigeration Systems—Lessons Learned," Proceedings of the IEEE International Conference on Control Applications, Taipei, Taiwan, Sep. 2-4, 2004, pp. 1248-1253.

Mell et al., "The NIST Definition of Cloud Computing," National Institute of Standards and Technology, U.S. Department of Commerce, Special Publication 800-145, Sep. 2011, pp. 1-7.

IBM, List of IBM Patents or Patent Applications Treated as Related, Appendix P, dated Apr. 3, 2019, 2 pages.

IBM: List of IBM Patents or Patent Applications Treated as Related (Appendix P), Feb. 2, 2018, pp. 1-2.

Devi et al., U.S. Appl. No. 15/887,225, filed Feb. 2, 2018, titled "Predictive Maintenance of Refrigeration Cases," pp. 1-49.

* cited by examiner

US 10,941,980 B2

PREDICTIVE MAINTENANCE OF REFRIGERATION CASES

BACKGROUND

The present invention relates to predictive maintenance, and more particularly to predictive maintenance of refrigeration cases. Refrigeration cases are relied on to maintain temperatures in applications such as food storage. Considering that even a brief failure of a refrigeration case can result in the spoilage of large amounts of food and money, refrigeration cases often require constant supervision to ensure proper function. Interestingly, many refrigeration case symptoms indicative of a failure can be foreseen prior to failure with proper supervision. This constant supervision, however, comes at a price. Constant supervision of large amounts of refrigeration cases is costly in terms of both hardware and human resources. Moreover, it is also common to have false alarms due to overly sensitive supervision, resulting in further added costs.

SUMMARY

Embodiments of the present invention disclose a method, a computer program product, and a computer system for predictive maintenance of refrigeration cases. A computer collects a temperature time series for a refrigeration case and, based on the temperature time series, learns a refrigeration case signature for both non-frost and defrost cycles. The computer generates features based on the refrigeration case signature and compares the refrigeration case signature to real time, or observed, temperatures and features using a rule-based and/or machine learning framework. Based on determining that the real time data varies beyond a threshold from the refrigeration case signature, the computer identifies a failure symptom of the refrigeration case and diagnoses a root cause of the symptom or failure. In addition, the computer may activate an alarm and open a work order corresponding to the root cause of the symptom or failure.

DETAILED DESCRIPTION

Figure 1:
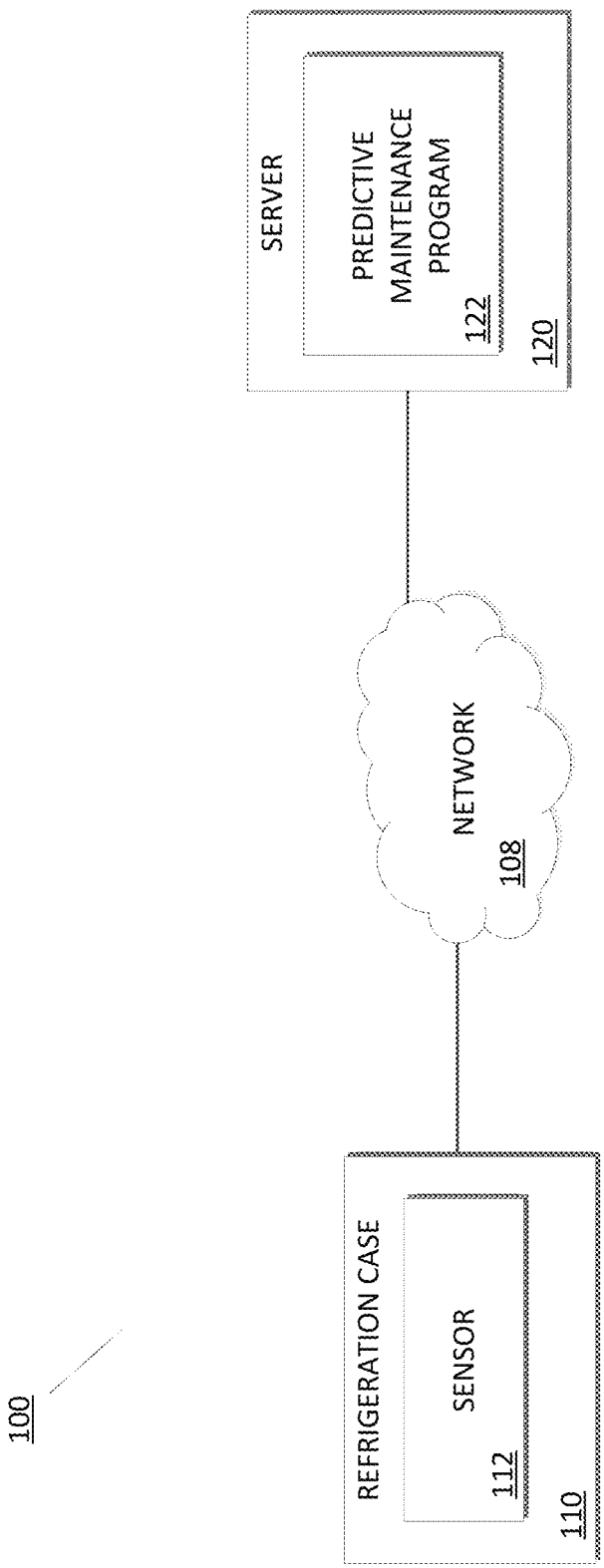
FIG. 1 is a schematic diagram of a predictive maintenance system 100, in accordance with an embodiment of the present invention.

A predictive maintenance system 100 in accordance with an embodiment of the invention is illustrated by FIG. 1. In the example embodiment, refrigeration case 110 performs defrost cycles periodically to prevent ice build-up on coils. During the defrost cycle, refrigeration case 110 temperatures typically follow a regular pattern, constituting a refrigeration case 110 signature. Deviation from this signature is often a symptom of an underlying issue or change in refrigeration case 110 state. In addition, issues can be detected far in advance by tracking defrost cycles and, what's more, certain issues manifest only during defrost cycles, thereby making it advantageous to track defrost cycles in addition to non-defrost cycles. The present invention leverages the use of the signature, as well as other features, in order to monitor the health of refrigeration case 110, predict the required maintenance of refrigeration case 110, identify failure symptoms of refrigeration case 110, and diagnose failures of refrigeration case 110.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between refrigeration case 110, server 120, and other electronic or mechanical devices.

In the example embodiment, refrigeration case 110 includes sensor 112 and is a refrigeration and cold storage system (RCSS) used for modifying the temperature of an area known as a case. For example, refrigeration case 110 may include refrigerators, coolers, freezers, air conditioners, and heat pumps. In the example embodiment, refrigeration case 110 is utilized to reduce temperature of the case, i.e.

cool, and operates in two cycles: a non-defrosting (operational) cycle in which a low operational temperature is maintained and a defrosting cycle in which the temperature is increased to melt ice that is built up on refrigeration case 110 coils. Moreover, refrigeration case 110 is capable of communicating with network 108 and other devices via means such as a local area connection (LAN), a Wi-Fi connection, a Bluetooth connection, an infrared connection, a near field communication (NFC), or other communication methods.

In the example embodiment, sensor 112 is an electronic component capable of measuring and detecting events or changes in the state of various metrics within refrigeration case 110. Sensor 112 may be a thermometer, humidity sensor, pressure sensor/barometer, power consumption meter of a the total system/individual components, revolutions per second/minute/hour of mechanical components such as a compressor or pump, gyroscope, accelerometer, compass, global positioning system (GPS), proximity sensor, camera, microphone, light sensor, infrared sensor, weight sensor, or other device used for measuring an environment or state. In the example embodiment, sensor 112 is located in the case of refrigeration case 110 and referenced via network 108.

In the example embodiment, server 120 includes predictive maintenance program 122 and may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 120 is shown as a single device, in other embodiments, server 120 may be comprised of a cluster or plurality of computing devices, working together or working separately. Server 120 is described in more detail with reference to FIG. 11.

Predictive maintenance program 122 is a software application capable of collecting a temperature time series corresponding to refrigeration case 110 and extracting defrost temperature data from the temperature time series. Predictive maintenance program 122 is further capable of filtering anomalous data from the defrost temperature data and extracting a defrost temperature signature from the remaining defrost temperature data. Moreover, predictive maintenance program 122 is capable of determining a defrost anomaly threshold and defrost feature based on the defrost temperature signature. In addition, predictive maintenance program 122 is capable of extracting a non-defrost, or operational, temperature signature the temperature time series and extracting non-defrost features from the non-defrost temperature signature. Predictive maintenance program 122 is further capable of extracting additional features from the data and a case type feature. Moreover, predictive maintenance program 122 is capable of measuring real time, or observed, data and identifying a failure symptom based on comparing the observed data to the temperature signatures. Based on identifying a failure symptom, predictive maintenance is capable of diagnosing a root cause of the symptom or failure and opening a work order to address the root cause. Lastly, predictive maintenance program 122 is capable of closing the work order upon rectification of the root cause responsible for the symptom or failure.

Figure 2A:
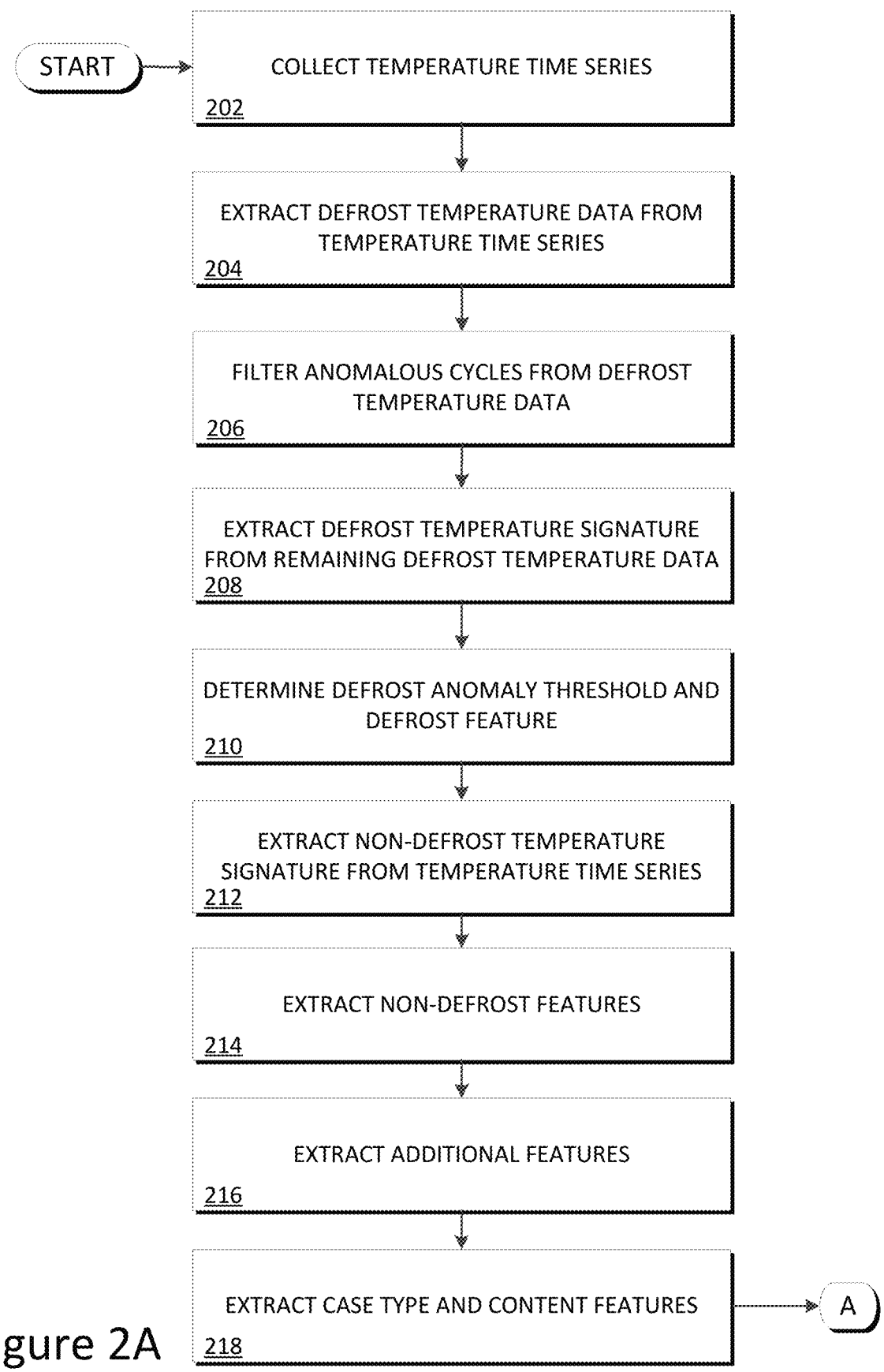
FIG. 2A is a schematic diagram illustrating the operations of predictive maintenance program 122 of predictive maintenance system 100 in predicting maintenance and identifying failure symptoms of refrigeration case 110, in accordance with an embodiment of the present invention.
Figure 2B:
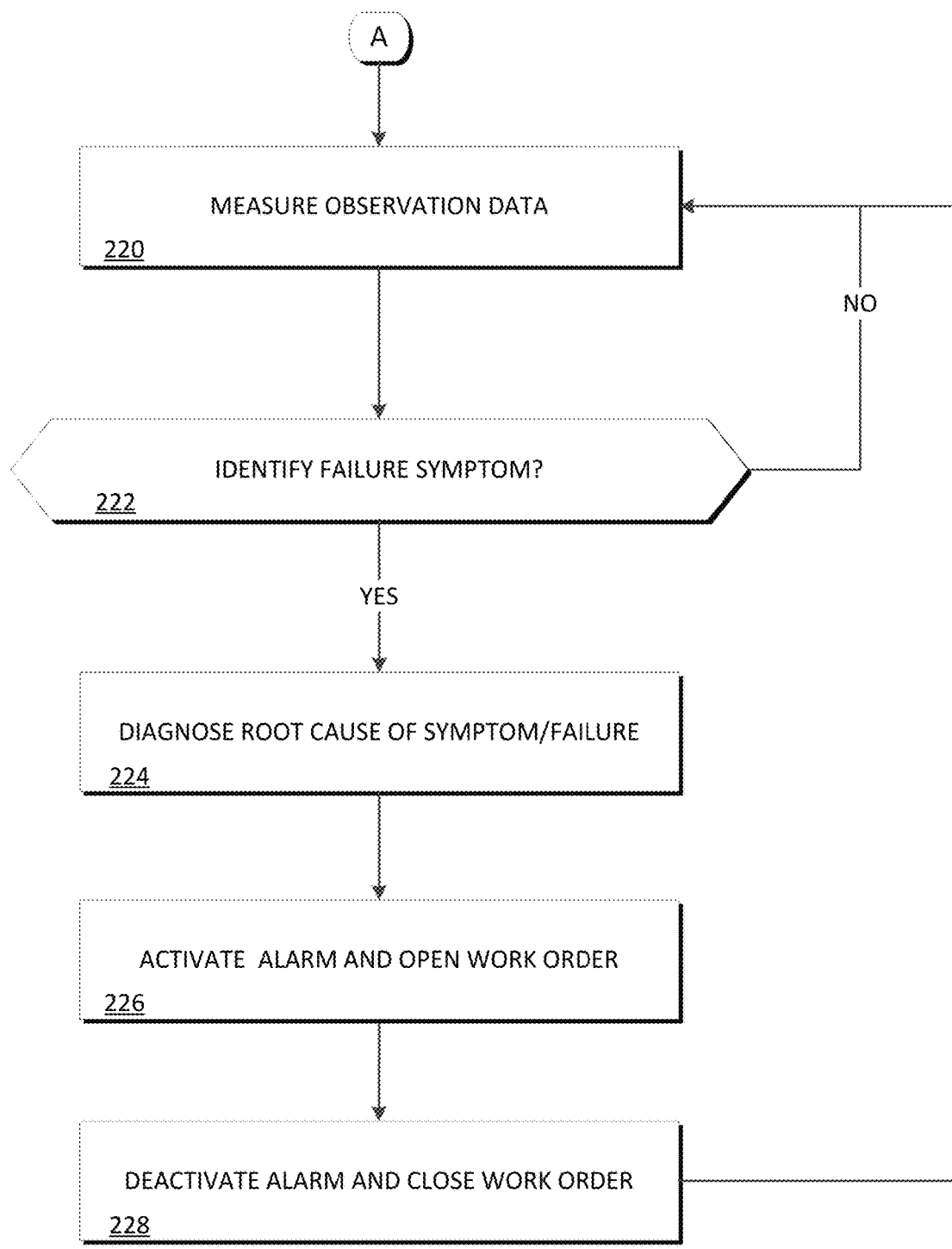
FIG. 2B is a schematic diagram illustrating the operations of predictive maintenance program 122 of predictive maintenance system 100 in predicting maintenance and identifying failure symptoms of refrigeration case 110, in accordance with an embodiment of the present invention.

FIGS. 2A and 2B illustrate the operations of predictive maintenance program 122 in identifying symptoms of a refrigeration case 110 failure. In the example embodiment, predictive maintenance program 122 utilizes either or both a rule-based and machine learning framework for identifying symptoms of a refrigeration case 110 failure, described in greater detail herein.

Predictive maintenance program 122 first collects a temperature time series, or sequence of incremental temperature measurements, corresponding to the non-defrost and defrost cycles of refrigeration case 110 (step 202). In the example embodiment, predictive maintenance program 122 utilizes the temperature time series as historical temperature data to derive typical non-defrost and defrost temperature patterns, or signatures, as well as extract features therefrom. Using the temperature time series of refrigeration case 110, predictive maintenance program 122 is capable of identifying metrics indicative of the most common causes of refrigeration case failure, including a faulty defrost profile, warming up of refrigeration case 110 that leads to an upward drift in temperature signal, increased variability in the temperature signal, and a sudden change in the daily expected temperature profile over a very short period (e.g. 1-2 days). In the example embodiment, predictive maintenance program 122 collects the temperature time series of refrigeration case 110 from previously collected data by, for example, reference to a database of temperature measurements. In other embodiments, predictive maintenance program 122 may be configured to reference sensor 112 for temperature measurements over the course of a threshold amount of non-defrost/defrost cycles, for example one hundred cycles, or over a specified period of time, such as one hour, day, or month.

Figure 3:
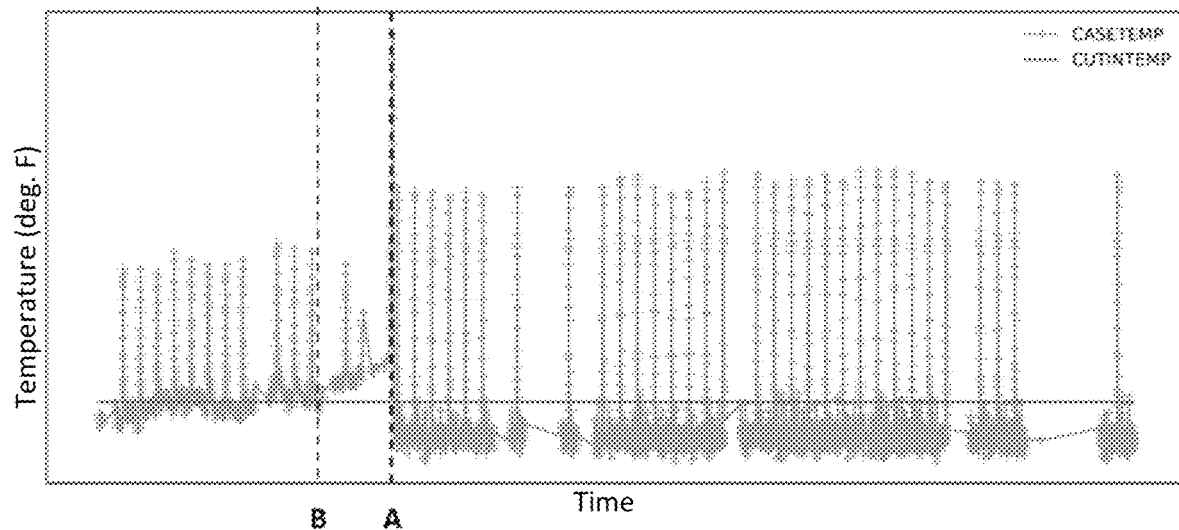
FIG. 3 illustrates a temperature time series of refrigeration case 110, in accordance with an embodiment of the present invention.

With reference to an illustrative example, FIG. 3 depicts a temperature time series corresponding to refrigeration case 110 wherein the y-axis indicates temperature (degrees Fahrenheit) and the x-axis indicates time. Data points high in temperature represent defrost cycles while data points low in temperature represent non-defrost operation.

Predictive maintenance program 122 extracts defrost temperature data from the temperature time series (step 204). Refrigeration case 110 is periodically defrosted to prevent ice build-up within the case by raising temperatures significantly higher than their normal operating temperatures for a specified duration. The specified defrost frequency, duration, and temperature are based on refrigeration case 110 type, for example a chest freezer or beverage refrigerator. In any (refrigeration) case, however, defrost cycle temperatures for each case type are somewhat consistent, constituting a defrost temperature signature. Accordingly, the present invention leverages, in either or both a rule-based and machine learning framework, the consistency of the defrost temperature signature to identify failure symptoms of refrigeration case 110 by identifying deviation of observed, i.e. real-time, data from the defrost signature. Not only is the defrost temperature signature consistent, but also capable of exhibiting symptoms of failure undetectable or only later detectable by simply monitoring non-defrost, i.e. operational, temperatures. In the example embodiment, predictive maintenance program 122 extracts defrost temperature data from the temperature time series by identifying temperature data having non-defrost and defrost flags indicative of when the data was sampled. Alternatively, predictive maintenance program 122 may be configured to reference temperature data corresponding to times at which non-defrost/defrost cycles are scheduled or configured to learn a slope change that is indicative of a transition from a defrost to a non-defrost state and vice versa.

With reference again to FIG. 3 (step 204 continued), predictive maintenance program 122 identifies data corresponding to defrost cycles by identifying defrost flags associated with previously collected data. Alternatively, predictive maintenance program 122 may be trained to reference data during scheduled defrost cycles or trained to identify a change in slope indicative of a change to defrost cycles. To illustrate the principle that some symptom manifestations are only apparent when monitoring defrost temperatures, FIG. 3 depicts refrigeration case 110 reaching the set temperature regularly during non-defrost cycles up until point B despite having abnormally low defrost temperatures measuring ~25% cooler than normal. Importantly, low defrost temperatures are an indication that temperatures in refrigeration case 110 are not warm enough for ice built up on the coils to melt off, likely leading to poor operational performance and/or subsequent failure. After failing to reach set temperature following point B, refrigeration case 110 is repaired and functioning properly following point A. Notably, simply monitoring non-defrost, i.e. operational, cycle temperatures would not have identified the pending failure prior to point B because the set temperature was reached during operation and thus no alarm was raised. Conversely, monitoring and examination of defrost cycle temperatures would have indicated well in advance of point B that a failure was pending, thereby saving money, time, and product.

Predictive maintenance program 122 filters out anomalous defrost cycles from the defrost temperature data (step 206). Like outliers, anomalous cycles deviate from the typical defrost cycles, as depicted at a high level by FIG. 4 and with greater detail by FIG. 5, and are likely to skew the later determined defrost temperature signature. Accordingly, predictive maintenance program 122 removes anomalous cycles by, in the example embodiment, eliminating data which exceed the upper and lower bounds of refrigeration case 110 set point temperatures. In this process, predictive maintenance program 122 considers refrigeration case 110 operating temperature thirty minutes immediately prior to and post defrost. If the average temperature during either time period is outside the upper or lower respective bounds, the intervening defrost cycle is considered anomalous and discarded.

Figure 6:
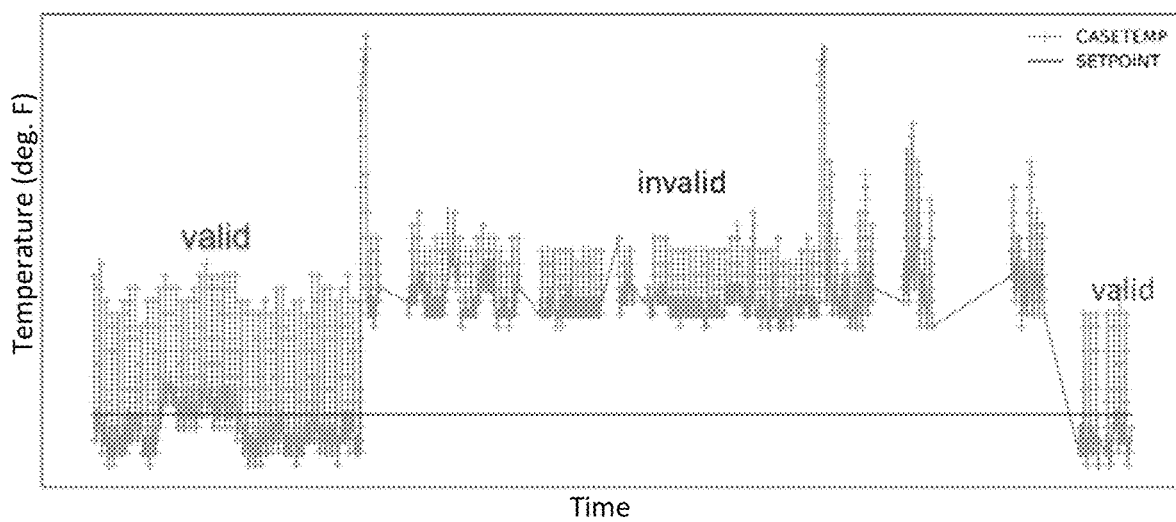
FIG. 6 illustrates a temperature time series having valid and invalid defrost cycles based on refrigeration case 110 set temperature preceding and subsequent to defrosting, in accordance with an embodiment of the present invention.

With reference again to an illustrative example depicted FIG. 6, predictive maintenance program 122 identifies anomalous, or invalid, defrost cycles by comparing the adjoining non-defrost cycle temperatures to the set point thirty minutes prior to and post defrost cycle. Here, data points collected after the case temperature exceeded the upper bound set point (horizontal line) are considered invalid and discarded as being anomalous.

Predictive maintenance program 122 extracts a defrost temperature signature from the remaining defrost temperature data (step 208). In the example embodiment, predictive maintenance program 122 extracts the defrost temperature signature based on the most prevalent patterns in the remaining data. In order to extract the defrost temperature signature, predictive maintenance program 122 first determines whether the remaining temperature defrost data is homogenous by identifying dominant clusters within the data. In the example embodiment, predictive maintenance program 122 identifies clusters using hierarchical clustering with Dynamic Time Warping (DTW) distance as the distance function. DTW is an algorithm used in time series analysis that measures similarities between two temporal sequences which may vary in speed. If predictive maintenance program 122 determines that the set is homogenous, clustering yields a single cluster containing all but a very few cycles. With reference to an example illustrated by FIG. 7, predictive maintenance program 122 identifies the depicted dominant cluster and utilizes the dominant cluster as a basis for the defrost temperature signature. For case in which no dominant cluster emerges, predictive maintenance program 122 identifies one or more valid clusters of the data capable of contributing to the defrost temperature signature. In the example embodiment, the method for identifying the one or more valid clusters depends on whether the cycles in the clusters are contiguous in the time series, as depicted by an example in FIG. 8, or non-continuous in time series, as depicted by an example in FIG. 9. In the case of contiguous clusters (FIG. 8), identifying valid clusters comprises the additional step of dropping all contiguous clusters that end with a work order. Then, the remaining cycles, contiguous or not, are used in constructing the defrost temperature signature. In the example embodiment, predictive maintenance program 122 takes the median of the cycles that remain as the defrost temperature signature. In other embodiments, however, predictive maintenance program 122 may determine a defrost temperature signature alternatively.

Predictive maintenance program 122 determines an anomaly threshold from the defrost temperature signature (step 210). In the example embodiment, the anomaly threshold defines a maximum tolerable deviation of observed data from the defrost temperature signature established above. This anomaly threshold may be used as a limit when implementing a rule-based framework or, alternatively, may be used to define a feature, namely the defrost anomaly score, when implementing a machine learning framework. In the rule-based framework, temperature data falling within the anomaly threshold is considered routine while temperature data falling outside of the anomaly threshold is considered anomalous, i.e. a failure symptom of future refrigeration case 110. In the example embodiment, predictive maintenance program 122 determines the anomaly threshold by computing the DTW distance of each valid cycle from the defrost temperature pattern and taking the $98^{th}$ percentile of the distances as the threshold. When implementing a machine learning framework, predictive maintenance program 122 may normalize the DTW distance of the anomaly threshold into one of six anomaly ranges, designated 0-6. In such embodiments, predictive maintenance program 122 maintains a moving average of the anomaly range, which is designated as the feature defrost anomaly score (DAS). The rule-based and machine learning frameworks are described in greater detail in the proceeding paragraphs.

Predictive maintenance program 122 extracts a non-defrost temperature signature from the temperature time series (step 212). Similar to the use of the defrost temperature signature, predictive maintenance program 122 utilizes the non-defrost temperature signature as a baseline for identifying and quantifying deviations of observed, i.e. real time, data. These deviations are measured as a deviation score used in computing whether a failure symptom is indicated by the data. In less advanced embodiments, predictive maintenance program 122 may define the non-defrost temperature signature as the temperature time series as is and define the deviation score as a distance metric between an observed temperature signature and the non-defrost temperature signature. In more complex embodiments, predictive maintenance program 122 may define the non-defrost temperature signature as a value of a smoothed version of the temperature time series and define the deviation score as a function of the change in value of the smoothed version over a given period time.

Figure 10:
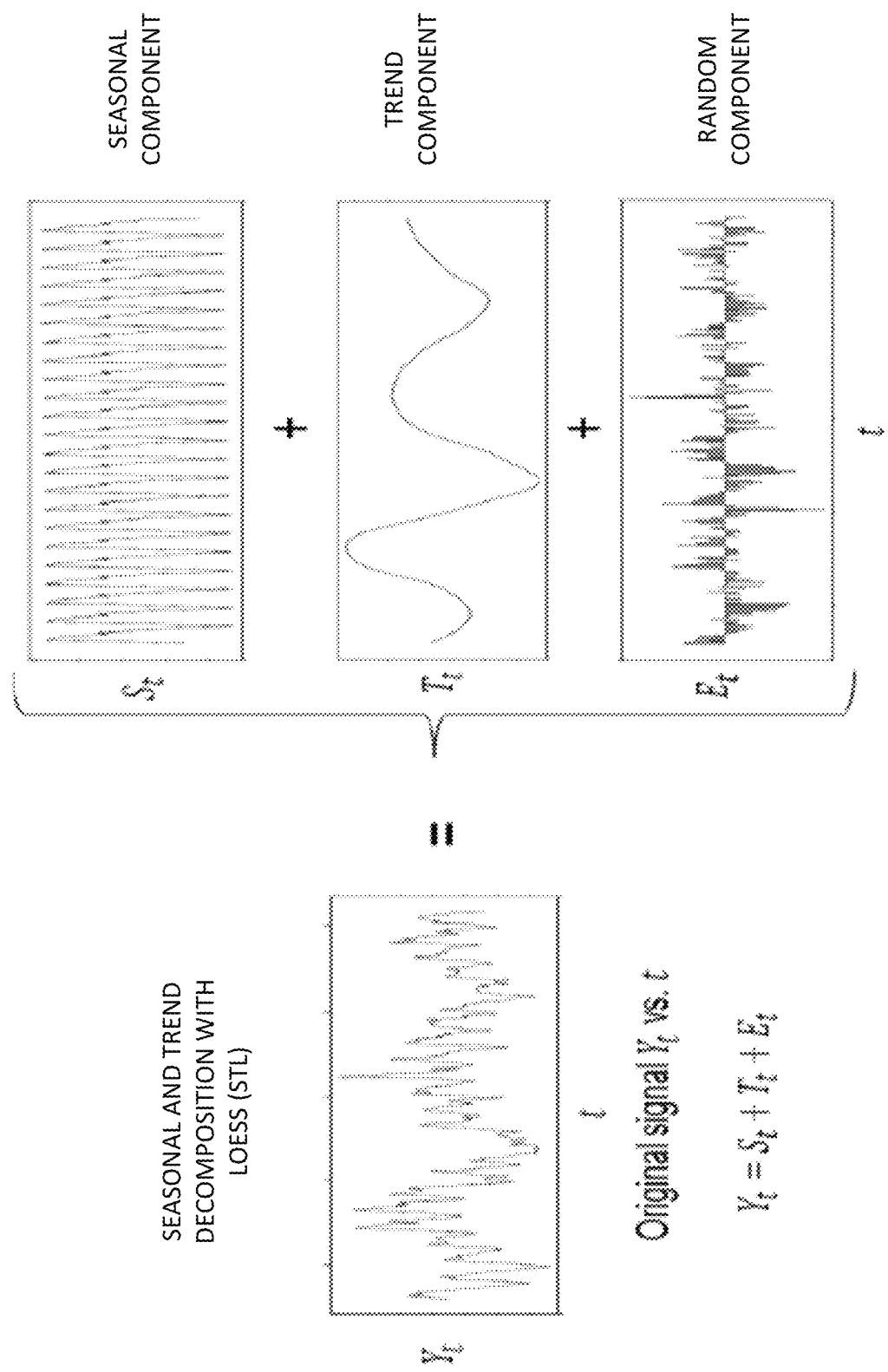
FIG. 10 illustrates a non-defrost temperature time series broken down into seasonal, trend, and random components, in accordance with an embodiment of the present invention.

In the example embodiment, however (step 212 continued), predictive maintenance program 122 defines the non-defrost temperature signature as a decomposed version of the temperature time series and defines the deviation score as a result of a function applied to the resulting components, such functions including a standard deviation, variance, skewness, exceedance beyond given ranges, etc. Specifically, in the example embodiment predictive maintenance program 122 decomposes the temperature time series using a seasonal and trend decomposition of time series by Loess (STL). The STL additively decomposes the measured temperature time series ($Y_t$) of a last k days into seasonal ($S_t$), trend ($T_t$), and random ($E_t$) components, as depicted by FIG. 10 and summarized by Equation 1:

$$Y_t = S_t + T_t + E_t \qquad (1)$$

Predictive maintenance program 122 extracts features from the non-defrost temperature pattern (step 214). Specifically, predictive maintenance program 122 utilizes the resulting seasonal, trend, and random components in computing refrigeration case 110 features such as a drift score, a volatility score, and an anomaly score. The seasonality component ($S_t$) of the non-defrost temperature signal is primarily due to the defrost activity that happens at several specific times per day (on average 2-6) and the daily/weekly store activity based on store operating hours and customer traffic patterns. Thus, as the currently discussed features are concerned with non-defrost performance, the seasonal component is removed from the data and will be disregarded in the following calculations. Predictive maintenance program 122 utilizes the trend component ($T_t$) of the non-defrost temperature signature to determine the feature drift score ($D_t$), or variation in trend day to day, which for a given day (t) is defined by Equation 2 as:

$$D_t = T_t - T_{t-1} \qquad (2)$$

In the example embodiment, the drift score feature represents a difference in the trend score of the current day (t) and the previous day (t−1).

Similarly, predictive maintenance program 122 utilizes the random component ($E_t$) of the non-defrost temperature signal to derive a feature for a volatility score ($V_t$), or average variability between consecutively measured temperatures, where the volatility score for a given day (t) is defined by Equation 3 as:

$$V_t = \frac{1}{n}\sum_{1}^{n} |E_t - E_{t-1}| \qquad (3)$$

Here, $E_t$ and $E_{t-1}$ are computed based on the STL decomposition of the non-defrost temperature signal over n days, e.g. 21 days. In the example embodiment, the volatility score for a given day is computed as the average of the absolute values of the difference between the random component on a given day ($E_t$) and a day earlier ($E_{t+1}$) computed over the last n days. Restated, the volatility score provides a measure of the absolute change in the random component day-to-day, on an average, in the last n days.

In addition, predictive maintenance program 122 computes a feature for anomalies, expressed as an anomaly score. The anomaly score is used to account for any sudden changes in the daily temperature profile of a given refrigeration case 110. In the example embodiment, the anomaly score ($A_t$) for a given day (t) is the dynamic time warp (DTW) distance between the daily temperature profile ($X_t$) and the median temperature profile of the last m days ($X_t^{median}$) as defined by Equation 4:

$$A_t = DTW(X_t, X_t^{median}) \qquad (4)$$

Here, the daily temperature profile ($X_t$) is computed as the time series of temperatures from the first to the final timestamp of a given day. The median temperature profile ($X_t^{median}$) is computed as the time series of median temperatures over the last m days for each timestamp in a given day. Predictive maintenance program 122 operates under the assumption that the temperature at a given time-stamp of a day is not expected to deviate much from the median temperature value at a close enough timestamp in the last m days (e.g. 10). Based on the aforementioned calculations, predictive maintenance program 122 identifies the features of drift score, volatility score, and anomaly score from the non-defrost temperature signal.

Predictive maintenance program 122 generates additional features for input into feature matrix X (step 216). In the example embodiment, predictive maintenance program 122 generates new features by applying different time series aggregation functions over time windows of differing lengths in the past to the previously identified features of feature matrix X, i.e. drift score, volatility score, and anomaly score. The reason for utilizing various time windows is to more closely identify anomalous activity. For example, the mean of a metric may be consistent over some length of time, e.g. two days, however over a longer duration, e.g. seven days, anomalous data may become more apparent. This functionality allows for more sensitivity and precise identification of when a symptom manifests. In the example embodiment, for some score ($Sc_t$) on a given day (t) the corresponding time series aggregated score over k days in the past ($ASc_{t,k}$) is defined by Equation 5:

$$ASc_{t,k} = f(Sc_t, Sc_{t-1}, \ldots, Sc_{t-k}) \qquad (5)$$

Here, f is any suitable aggregating function (e.g. mean, median, max, range, consecutive/non-consecutive days of metrics exceeding x percentile, etc.) or combination thereof and k is the length of the time window in the past (e.g. k=5, 10, etc.). In the example embodiment, particular aggregating functions may be more suitable for certain scenarios than others. For example, a spike in temperature may be best captured by a max function while consistently high temperatures may be best captured by a mean or median function. In general, the aggregating functions by which the features are measured are not limited to those described herein and may be customized to a particular refrigeration case 110 or case type.

Predictive maintenance program 122 extracts case type and content features (step 218). In the example embodiment, case type and contents are considered a categorical feature of feature matrix X because refrigeration case 110 can generally be classified into several types. For example, cases containing beverages are usually kept at a similar temperature, e.g. mid-thirties degrees Fahrenheit, while cases containing frozen foods are typically kept below thirty-two degrees Fahrenheit. Similarly, defrost set temperatures as well as defrost cycle frequency are also consistent among similar cases and, accordingly, such case type characteristics may be incorporated as a feature into feature matrix X as a case type score.

Continuing at FIG. 3, predictive maintenance program 122 measures observation data (step 220). In the example embodiment, observation data, i.e. observed data, are real time measurements of metrics used in calculating the aforementioned features of refrigeration case 110. Specifically, observation data is a representation of the current state of refrigeration case 110 that is compared to the previously determined typical performance, i.e. signatures, in order to identify symptoms of a failure. In the example embodiment, predictive maintenance program 122 measures observation data, such as an observational defrost temperature time series and observational non-defrost temperature time series, by reference to sensor 112 of refrigeration case 110. In other embodiments, predictive maintenance program 122 may make reference to or collect observation data alternatively, for example by means used for collecting the temperature time series at step 202 in FIG. 2A.

Predictive maintenance program 122 determines whether a failure symptom is identified (decision 222). The present invention may employ a variety of methods using any one of the aforementioned features in order to identify failure symptoms. Two of such methods are disclosed herein for illustrative purposes.

In one embodiment of the present invention administering a rule-based framework (decision 222 continued), predictive maintenance program 122 identifies failure symptoms by calculating a deviation of the observed defrost data from the defrost temperature signature. In this particular embodiment, the defrost temperature signature is used as a baseline and observed data exceeding the determined anomaly threshold relative to the defrost signature is an indication of a failure symptom. In order to compare the defrost temperature pattern with the observed data, predictive maintenance program 122 utilizes DTW. If predictive maintenance program 122 determines that the observed defrost data exceeds the anomaly threshold relative to the defrost temperature signature, predictive maintenance program 122 considers the data anomalous and an indication of a failure symptom. In other embodiments, however, other statistical methods may be employed.

In another embodiment employing a machine learning framework (decision 222 continued), predictive maintenance program 122 identifies failure symptoms based on a feature matrix X that outputs a binary variable y indicating the absence (0) or presence (1) of a failure symptom. The rows of feature matrix X represent days of operation while the columns represent refrigeration case 110 features calculated above, such as features based on defrost temperatures (i.e. defrost anomaly score), features based on non-defrost temperatures (drift score, volatility score, and anomaly score), features derived by applying aggregating functions to features, and features based on case type and case content. Features contained in the columns of feature matrix X are selectively chosen to best capture the impact of some of the most probable symptoms leading to a failure in refrigeration case 110, including a faulty defrost profile, warming up of refrigeration case 110 that leads to an upward drift in temperature signal, increased variability in the temperature signal, and a sudden change in the daily expected temperature profile over a very short period (e.g. 1-2 days). In the example embodiment, predictive maintenance program 122 computes binary outcome variable y based on feature matrix X and an outcome of 1 is an indication that a symptom of a pending failure in refrigeration case 110 has been identified. It will be appreciated that in other embodiments, more or less features and other calculations may be implemented in identifying failure symptoms of refrigeration case 110.

In order to train predictive maintenance program 122 to use feature matrix X, predictive maintenance program 122 first loads previous data, including past failures and the measurements leading up to the failure, into the feature matrix (decision 222 continued). Predictive maintenance program 122 then computes feature matrix X before, during, and after a failure in order to identify patterns and symptoms indicative of a current or future failure. Because the previously recorded failures may not be accounted for (i.e. work order submitted) until long after symptoms of a failure have manifested and, importantly, because the data leading up to a failure is the best predictor of a failure, predictive maintenance program 122 considers the previous d amount of days leading up to a recorded failure as having a failure symptom (i.e. binary outcome variable y=1). This method applies the presumption that although the failure was likely not recorded until the day refrigeration case 110 failed to reach set temperature, symptoms of the failure could have been identified d days prior to the recorded failure. In the example embodiment, d is defined as twenty-one days and thus the three weeks leading up to a recorded failure are marked as having symptoms of a failure in order to machine learn patterns indicative of a failure symptom. Predictive maintenance program 122 computes feature matrix X for the days leading up to the recorded failure and derives a pattern of feature behaviour, as a whole, that may be used to predict future failures. A feature matrix X may be created for a variety of refrigeration cases 110 and a final feature matrix X may be computed by appending the feature matrices of all refrigeration cases.

If predictive maintenance program 122 does not identify a failure symptom (decision 222 "NO" branch), then predictive maintenance program 122 continues to measure observation data (step 220) and subsequently identify failure symptoms (decision 222).

If predictive maintenance program 122 identifies a failure symptom (decision 222, "YES" branch), then predictive maintenance program 122 diagnoses a root cause of the symptom or failure (step 224). In the example embodiment, predictive maintenance program 122 diagnoses a root cause of failure symptom using features including the non-defrost and defrost features, previous labelled root cause data, process parameters of refrigeration case 110, and a type of refrigeration case 110. For example, predictive maintenance program 122 may reference rich labelled data detailing previous failures in order to machine learn patterns associated with the corresponding types of root causes. Based on the type of symptom or failure detected, predictive maintenance program 122 can reference past data, subject matter experts, or a combination thereof in order to identify a typical root cause of the symptom or failure, provide options/strategies to address it, and recommend the best option based on associated costs and risks.

Predictive maintenance program 122 activates an alarm and opens a work order corresponding to failure symptom or failure (step 226). In the example embodiment, predictive maintenance program 122 activates an alarm based on the confidence score exceeding a threshold amount. Moreover, predictive maintenance program 122 will additionally open a work order for the failure symptom or failure based on the confidence score.

Predictive maintenance program 122 deactivates the alarm and closes the work order (step 228). Upon completion of the work order and resolution of the failure symptom or failure, predictive maintenance program 122 deactivates the alarm and closes the work order.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

FIG. 3 illustrates a temperature time series of refrigeration case 110, in accordance with an embodiment of the present invention.

Figure 4:
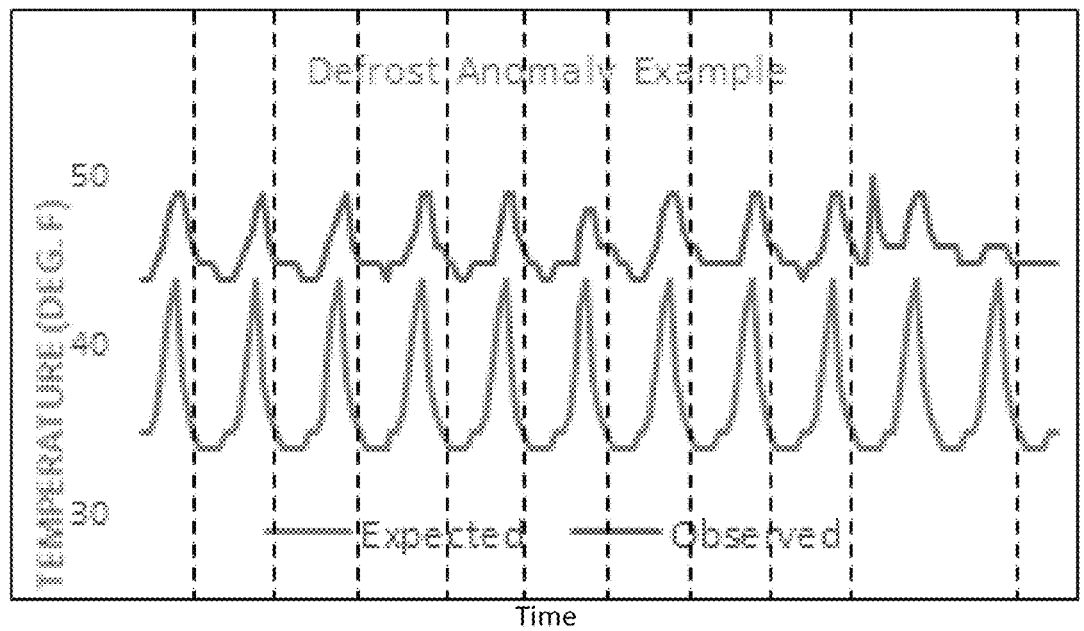
FIG. 4 illustrates expected and anomalous defrost cycles, in accordance with an embodiment of the present invention.

FIG. 4 illustrates expected and anomalous defrost cycles, in accordance with an embodiment of the present invention.

Figure 5:
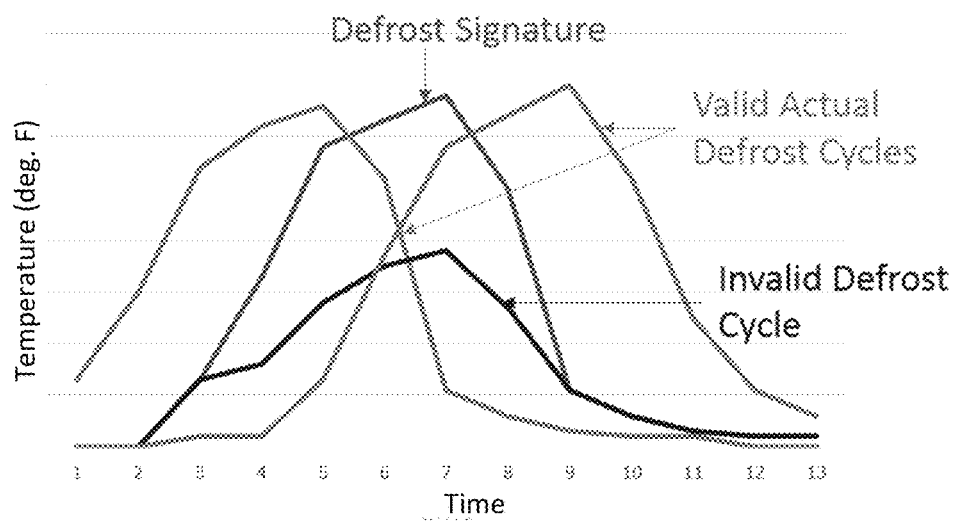
FIG. 5 illustrates valid and invalid defrost cycles of refrigeration case 110, in accordance with an embodiment of the present invention.

FIG. 5 illustrates valid and invalid defrost cycles of refrigeration case 110, in accordance with an embodiment of the present invention.

FIG. 6 illustrates a temperature time series having valid and invalid defrost cycles based on refrigeration case 110 set temperature preceding and subsequent to defrosting, in accordance with an embodiment of the present invention.

Figure 7:
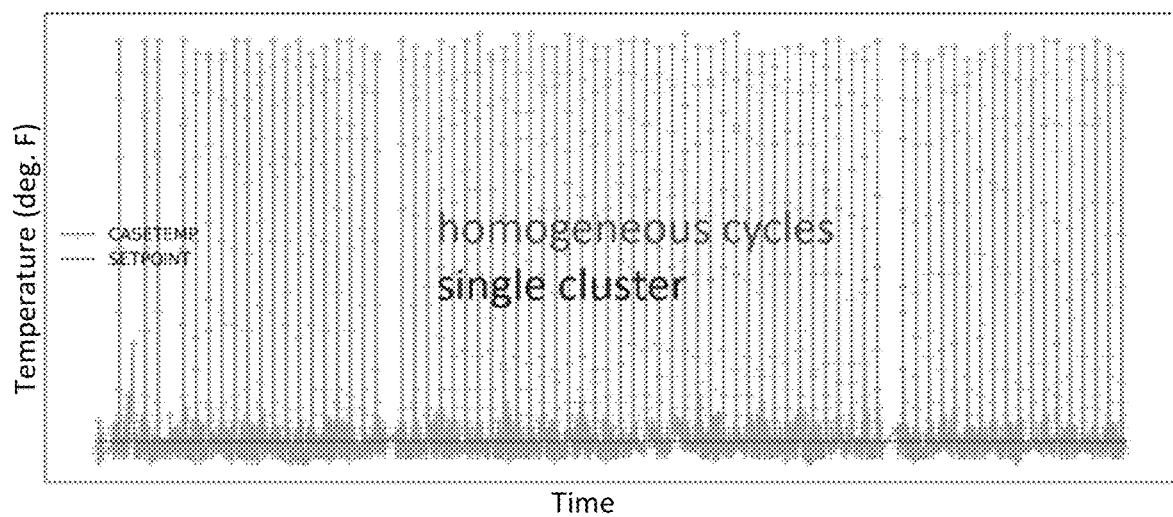
FIG. 7 illustrates a homogenous cluster of defrost cycles, in accordance with an embodiment of the present invention.

FIG. 7 illustrates a homogenous cluster of defrost cycles, in accordance with an embodiment of the present invention.

Figure 8:
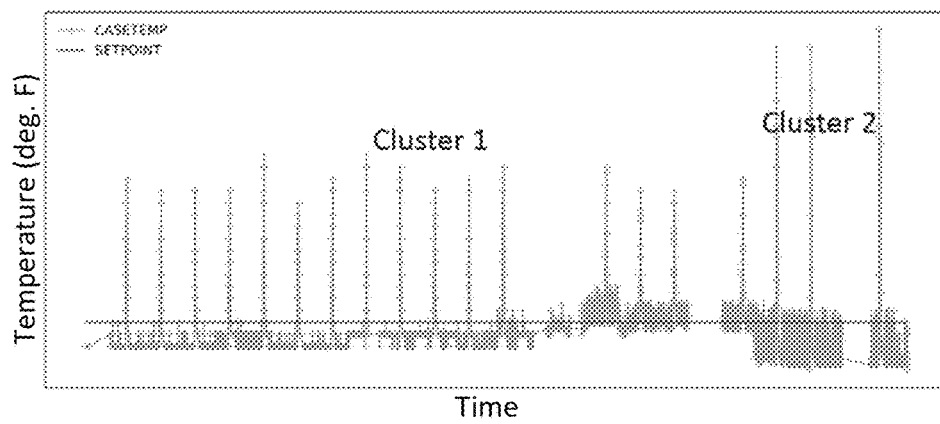
FIG. 8 illustrates a continuous cluster of defrost cycles, in accordance with an embodiment of the present invention.

FIG. 8 illustrates a continuous cluster of defrost cycles, in accordance with an embodiment of the present invention.

Figure 9:
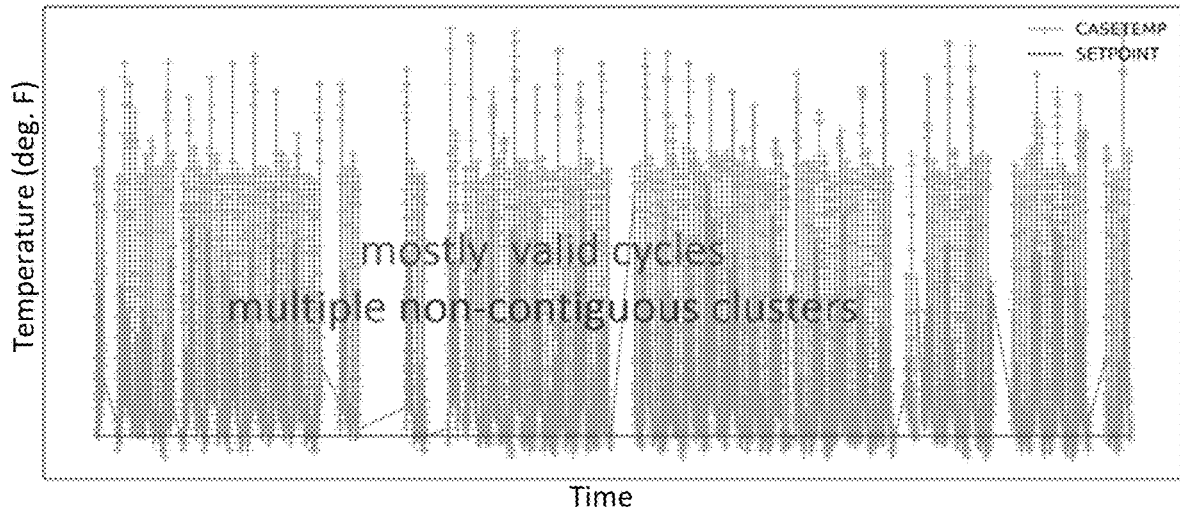
FIG. 9 illustrates a non-continuous cluster of defrost cycles, in accordance with an embodiment of the present invention.

FIG. 9 illustrates a non-continuous cluster of defrost cycles, in accordance with an embodiment of the present invention.

FIG. 10 illustrates a non-defrost temperature time series broken down into seasonal, trend, and random components, in accordance with an embodiment of the present invention.

Figure 11:
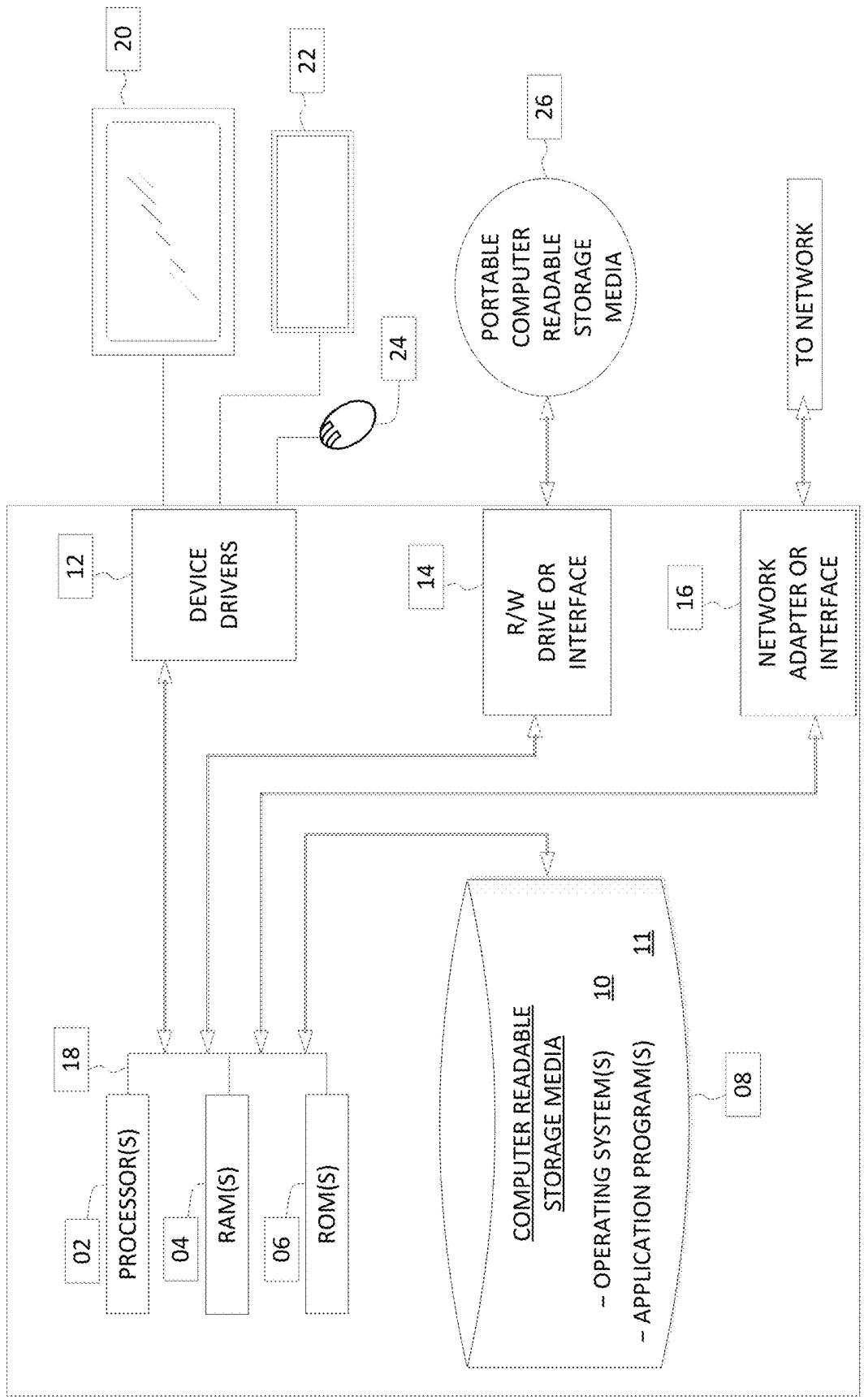
FIG. 11 is a block diagram depicting the hardware components of predictive maintenance system 100 of FIG. 1, in accordance with an embodiment of the invention.

FIG. 11 depicts a block diagram of components of server 120 of predictive maintenance system 100 of FIG. 1, in accordance with an embodiment of the present invention. It should be appreciated that FIG. 11 provides only an illustration of one implementation and does not imply any limitations with regard to the environments in which different embodiments may be implemented. Many modifications to the depicted environment may be made.

Server 120 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example predictive maintenance program 122, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 120 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Server 120 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Server 120 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
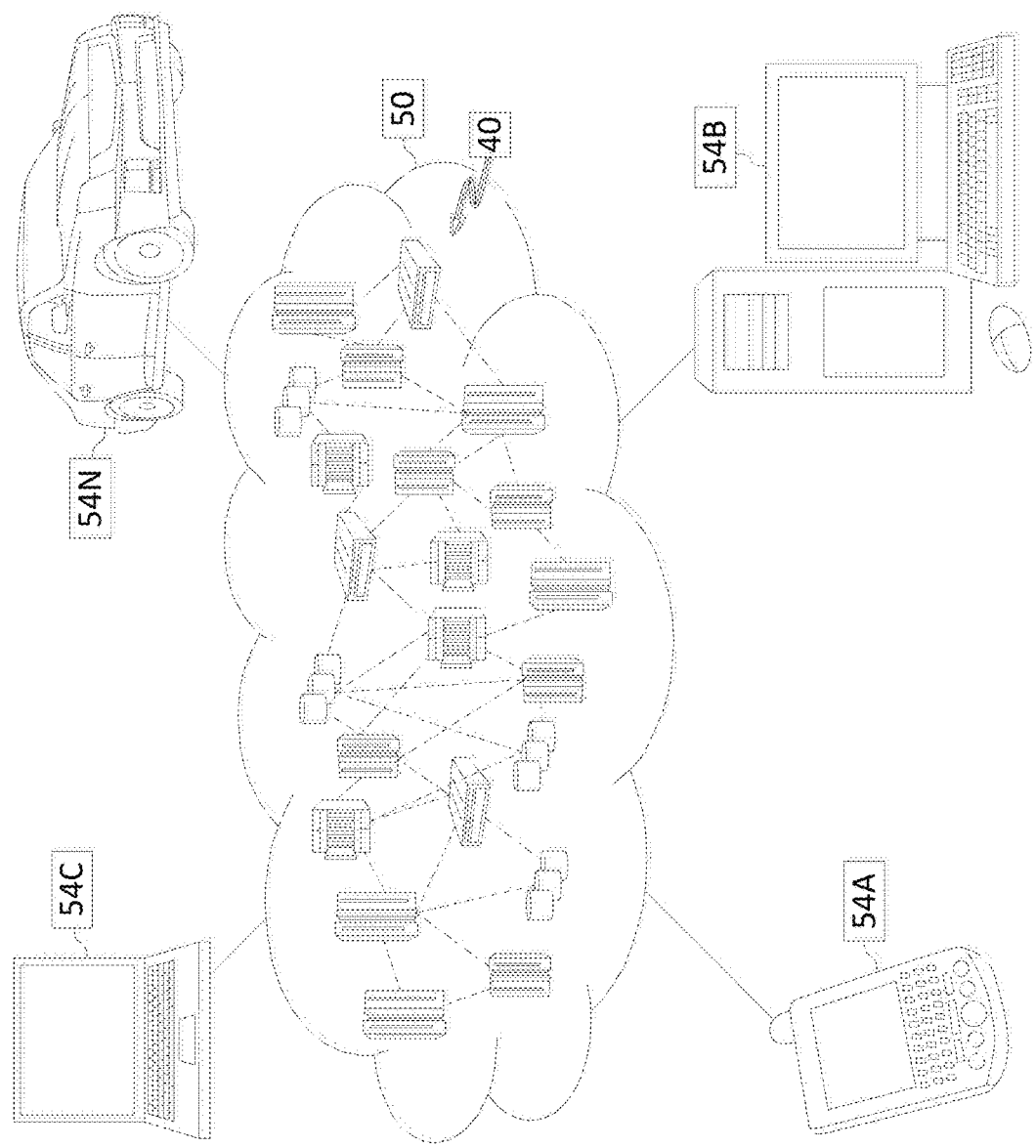
FIG. 12 depicts a cloud computing environment, in accordance with an embodiment of the present invention.

Referring now to FIG. 12, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 40 and cloud computing environment 50 can communicate with any type of computerized device over any type of network and/or network addressable connection (e.g., using a web browser).

Figure 13:
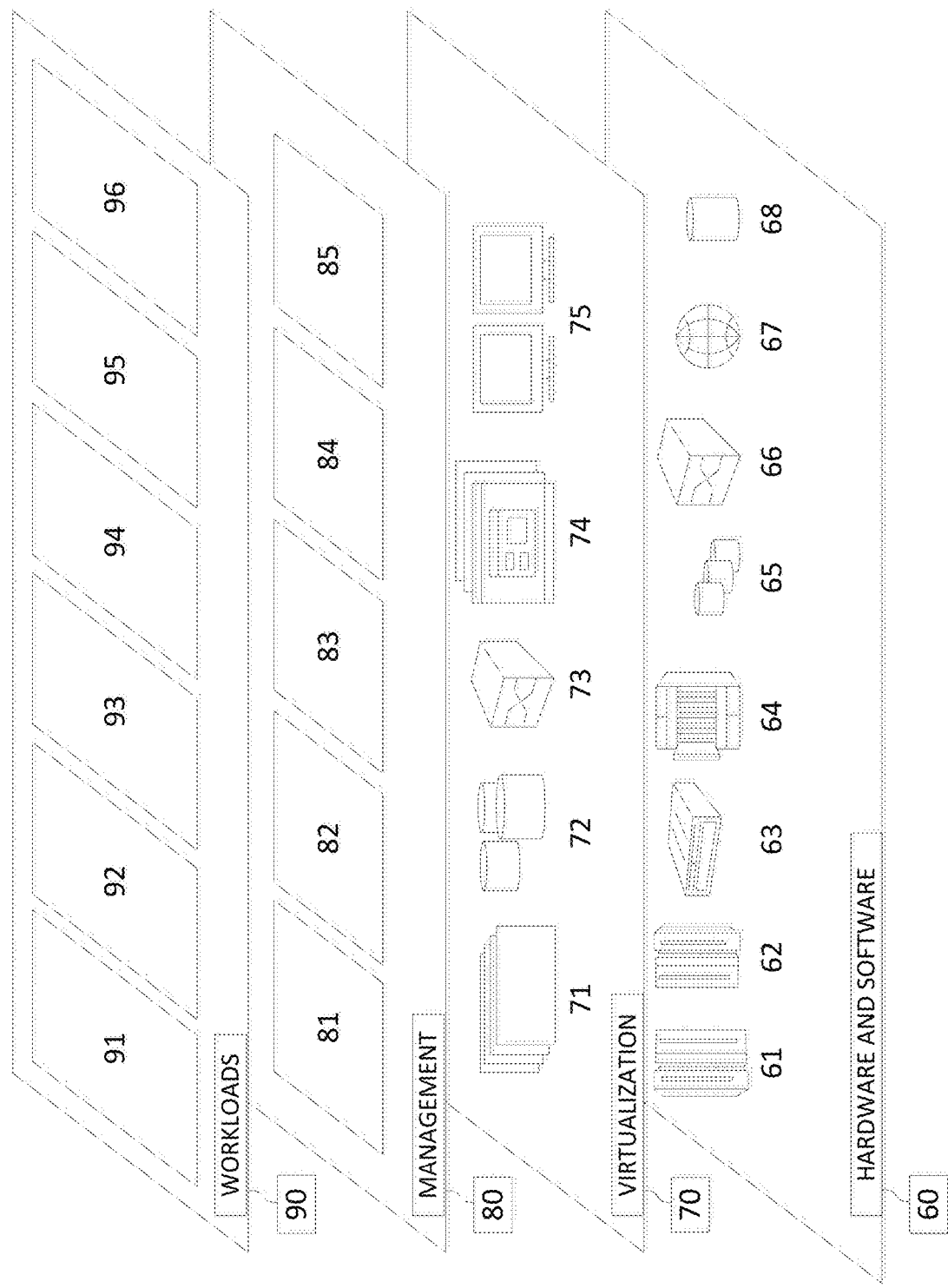
FIG. 13 depicts abstraction model layers, in accordance with an embodiment of the present invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and maintenance processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of predicting maintenance for a refrigeration case, the method comprising:
    measuring real time temperature data of a refrigeration case; and
    identifying a failure symptom of the refrigeration case based on comparing the real time temperature data to historical temperature data that comprises a defrost temperature signature and a non-defrost temperature signature, the identifying the failure symptom further comprising:
    determining an anomaly threshold based on the defrost temperature signature;
    based on determining that the real time temperature data exceeds the anomaly threshold, determining a defrost anomaly score;
    decomposing the non-defrost temperature signature into seasonal, trend, and random components;
    determining a drift score based on the trend component, a volatility score based on the random component, and an anomaly score based on a dynamic time warp distance between a daily temperature profile and a median temperature profile corresponding to a previous one or more days;
    generating a matrix having one or more rows representing one or more days of the refrigeration case operation and one or more columns representing the defrost anomaly score, the drift score, the volatility score, and the anomaly score;
    computing the matrix to output a binary variable of either a one or a zero; and
    wherein identifying the failure symptom is further based on the defrost anomaly score and computing the binary value of one;
    based on identifying the failure symptom, identifying one or more root causes;
    assigning a confidence score to the one or more root causes;
    ranking the one or more root causes based on the confidence score; and
    activating an alarm and opening a work order corresponding to a root cause of the one or more root causes having a highest confidence score.

2. The method of claim 1, wherein identifying the failure symptom of the refrigeration case based on comparing the real time temperature data to the historical temperature data further comprises:
    applying one or more time series aggregation functions over various time windows to the drift score, the volatility score, and the anomaly score, wherein the one or more time series aggregation functions include at least one of a mean, a median, a max, and a range; and
    wherein computing the matrix to output the binary variable is further based on the one or more columns of the matrix including the one or more time series aggregation functions.

3. The method of claim 2, wherein identifying the failure symptom of the refrigeration case based on comparing the real time temperature data to the historical temperature data further comprises:
    determining a case type score based on a case type of the refrigeration case; and
    wherein computing the matrix to output the binary variable is further based on the one or more columns of the matrix including the case type score.

4. The method of claim 1, wherein the defrost temperature signature is generated by:
    collecting a temperature time series corresponding to the refrigeration case, wherein the temperature time series contains one or more defrost cycles;
    filtering anomalous defrost cycles from the one or more defrost cycles by removing defrost cycles in which a preceding non-defrost cycle or subsequent non-defrost cycle did not reach a set temperature; and
    identifying the defrost temperature signature as a cluster of the remaining one or more defrost cycles.

5. A computer program product for predicting maintenance for a refrigeration case, the computer program product comprising:
    one or more computer-readable storage media and program instructions stored on the one or more computer-readable storage media for performing a method, the method comprising:
    measuring real time temperature data of a refrigeration case; and
    identifying a failure symptom of the refrigeration case based on comparing the real time temperature data to historical temperature data that comprises a defrost temperature signature and a non-defrost temperature signature, the identifying the failure symptom further comprising:
    determining an anomaly threshold based on the defrost temperature signature;
    based on determining that the real time temperature data exceeds the anomaly threshold, determining a defrost anomaly score;
    decomposing the non-defrost temperature signature into seasonal, trend, and random components;
    determining a drift score based on the trend component, a volatility score based on the random component, and an anomaly score based on a dynamic time warp distance between a daily temperature profile and a median temperature profile corresponding to a previous one or more days;
    generating a matrix having one or more rows representing one or more days of the refrigeration case operation and one or more columns representing the defrost anomaly score, the drift score, the volatility score, and the anomaly score;
    computing the matrix to output a binary variable of either a one or a zero; and
    wherein identifying the failure symptom is further based on the defrost anomaly score and computing the binary value of one;
    based on identifying the failure symptom, identifying one or more root causes;
    assigning a confidence score to the one or more root causes;
    ranking the one or more root causes based on the confidence score; and
    activating an alarm and opening a work order corresponding to a root cause of the one or more root causes having a highest confidence score.

6. The computer program product of claim 5, wherein the identifying the failure symptom of the refrigeration case based on comparing the real time temperature data to the historical temperature data further comprises:
    applying one or more time series aggregation functions over various time windows to the drift score, the volatility score, and the anomaly score, wherein the one or more time series aggregation functions include at least one of a mean, a median, a max, and a range; and wherein the computing the matrix to output the binary variable is further based on the one or more columns of the matrix including the one or more time series aggregation functions.

7. The computer program product of claim 6, wherein the identifying the failure symptom of the refrigeration case based on comparing the real time temperature data to the historical temperature data further comprises:
   determining a case type score based on a case type of the refrigeration case; and
   wherein the computing the matrix to output the binary variable is further based on the one or more columns of the matrix including the case type score.

8. The computer program product of claim 5, wherein the defrost temperature signature is generated by:
   collecting a temperature time series corresponding to the refrigeration case, wherein the temperature time series contains one or more defrost cycles;
   filtering anomalous defrost cycles from the one or more defrost cycles by removing defrost cycles in which a preceding non-defrost cycle or subsequent non-defrost cycle did not reach a set temperature; and
   identifying the defrost temperature signature as a cluster of the remaining one or more defrost cycles.

9. A computer system for predicting maintenance for a refrigeration case, the computer system comprising:
   one or more computer processors, one or more computer-readable storage media, and program instructions stored on one or more of the computer-readable storage media for execution of a method by at least one of the one or more processors, the method comprising:
   measuring real time temperature data of a refrigeration case; and
   identifying a failure symptom of the refrigeration case based on comparing the real time temperature data to historical temperature data that comprises a defrost temperature signature and a non-defrost temperature signature, the identifying the failure symptom further comprising:
      determining an anomaly threshold based on the defrost temperature signature;
      based on determining that the real time temperature data exceeds the anomaly threshold, determining a defrost anomaly score;
      decomposing the non-defrost temperature signature into seasonal, trend, and random components;
      determining a drift score based on the trend component, a volatility score based on the random component, and an anomaly score based on a dynamic time warp distance between a daily temperature profile and a median temperature profile corresponding to a previous one or more days;
      generating a matrix having one or more rows representing one or more days of the refrigeration case operation and one or more columns representing the defrost anomaly score, the drift score, the volatility score, and the anomaly score;
      computing the matrix to output a binary variable of either a one or a zero; and
      wherein identifying the failure symptom is further based on the defrost anomaly score and computing the binary value of one;
   based on identifying the failure symptom, identifying one or more root causes;
   assigning a confidence score to the one or more root causes;
   ranking the one or more root causes based on the confidence score; and
   activating an alarm and opening a work order corresponding to a root cause of the one or more root causes having a highest confidence score.

10. The computer system of claim 9, wherein the identifying the failure symptom of the refrigeration case based on comparing the real time temperature data to the historical temperature data further comprises:
   applying one or more time series aggregation functions over various time windows to the drift score, the volatility score, and the anomaly score, wherein the one or more time series aggregation functions include at least one of a mean, a median, a max, and a range; and
   wherein the computing the matrix to output the binary variable is further based on the one or more columns of the matrix including the one or more time series aggregation functions.

11. The computer system of claim 9, wherein the defrost temperature signature is generated by:
   collecting a temperature time series corresponding to the refrigeration case, wherein the temperature time series contains one or more defrost cycles;
   filtering anomalous defrost cycles from the one or more defrost cycles by removing defrost cycles in which a preceding non-defrost cycle or subsequent non-defrost cycle did not reach a set temperature; and
   identifying the defrost temperature signature as a cluster of the remaining one or more defrost cycles.

* * * * *